Patented June 7, 1949

2,472,135

UNITED STATES PATENT OFFICE 2,472,135

MANUFACTURE OF CONDENSATION PRODUCTS

Charles Weizmann, London, England, assignor to Polymerisable Products Limited, London, England, a company of Great Britain No Drawing. Application August 20, 1946, Serial No. 691,869. In Great Britain June 27, 1945

Section 1, Public Law 690, August 8, 1946
Patent expires June 27, 1965

5 Claims. (Cl. 260—465)

In the specification of co-pending application No. 591,857 the use, in certain condensation reactions, of the solid, finely divided complex formed from potassium hydroxide and certain organic solvents has been described. Such solvents are characterised by the presence in their molecule of 2 ether-oxygen atoms, separated by 1 or 2 carbon atoms. Such solvents, therefore, comprise the acetals and ketals, cyclic or noncyclic, and the dialkyl ethers of ethylene-glycols.

In the specification of application No. 591,857, the condensation was described between a compound containing a reactive methylene group or a methine group on the one hand, and, inter alia, the carbonyl group in a saturated carbonyl compound, such as an aldehyde group or a ketone group, on the other hand.

According to the present invention, it has now been found that the same complex catalyses the reaction (condensation) of a compound containing a reactive methylene group or a methine group with a member of the group consisting of the conjugated system of $\alpha,\beta$-unsaturated aldehydes, $\alpha,\beta$-unsaturated ketones and esters of $\alpha,\beta$-unsaturated acids. Reactive methylene and methine groups are defined according to this invention as such —CH$_2$— or —CH— groups which are directly linked to an unsaturated carbon atom, (which may be a carbon atom forming part of an aromatic nucleus), so that the hydrogen atom or atoms of the methylene or methine groups are made more mobile. The reaction consists in an addition of the substance containing the reactive methylene or methine group to the $\alpha,\beta$-unsaturated system according to the equation

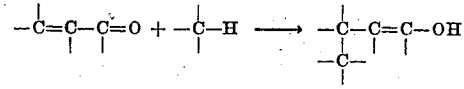

whereby, with the participation of the potassium hydroxide complex an enol is produced in the form of its potassium salt. Upon hydrolysis, e. g. with acids, this enol reverts to a saturated ketone:

so that in effect an addition of the reactive methylene or methine compound to the C,C-double bond of the unsaturated starting material takes place.

Compounds possessing a reactive methylene or methine group as defined above include diesters of malonic acid and of mono alkyl malonic acids, esters of aceto-acetic acid and of mono alkyl aceto-acetic acids, benzyl cyanide and acetonitrile. Compounds possessing the conjugated system of $\alpha,\beta$-unsaturated aldehydes, ketones and esters include diesters of maleic and fumaric acids, benzal-acetone, benzal-aceto-phenone and butylidene-butanal ($\alpha$-ethyl-$\beta$-propyl-acrolein).

The formation of the complex required for these reactions is best carried out in the following manner: 180 parts by weight of solid potassium hydroxide, e. g. granules or powder, are added to 500 parts by weight acetaldehyde-dibutylacetal, which is gradually heated while stirring. At about 150° C. the potassium hydroxide complex liquefies and (if allowed to stand at rest) forms a bottom layer, consisting (when cooled) of a crystallized molecular compound of KOH with the said acetal. When the liquid mass is cooled with thorough agitation, the complex solidifies to a finely divided microcrystalline powder, which is suspended in the excess of the acetal. Other acetals boiling above about 100° C., show the same behaviour and give similar complexes. It will be understood that if the acetal used has a low boiling point, the heating will be done in a closed vessel under pressure. This method may of course be varied in some of its details depending upon the particular acetal, ketal or ethylene-glycol ether which is used. The selection of the organic component of the complex should preferably be made so that (a) Its boiling point is higher than 100° C. and preferably higher than 120° C., and (b) Its boiling point is sufficiently different from the boiling temperature of the starting materials to be condensed and from that of the finished product.

When the substances to be reacted together are added to the complex, usually an exothermic reaction sets in. It is completed by heating at a suitable temperature not above 120° C., so as to avoid liquefaction of the complex. The reaction mixture can be hydrolysed either with ice or water (in case the reaction product would not be decomposed by the KOH solution so produced) or else with dilute acid, care being taken that no large excess of acid is present which would induce the hydrolysis of the acetal or glycol ether. In the former case, the potassium hydroxide can be recovered by evaporation of the aqueous solution, e. g. using the process described in British application No. 12928/44 (now British Patent 594,182).

The following examples serve to illustrate the invention without in any way limiting it.

EXAMPLE 1

*Addition of diethyl malonate to diethyl maleate*

20 g. powdered potassium hydroxide, containing 16.8 g. (0.3 mol) pure KOH, were converted into the complex with 180 cc. acetaldehyde dipropyl acetal. A mixture of 51.6 g. (0.3 mol) diethyl maleate and 64.0 g. (0.4 mol) diethyl malonate was slowly added to the fine, well stirred suspension at 20° C. An exothermic reaction, raising the temperature to about 40° C., set in, the mixture becoming rather thick, due to the formation of the enolate. The stirring was continued at 90° C. for one hour. The reaction mixture was then cooled, decomposed with ice water and immediately acidified with dilute sulphuric acid. The acetal layer was separated and the aqueous layer extracted with a small volume of fresh acetal.

Fractional distillation of the combined and dried acetal solutions gave:

At 50–60° C./17 mm. acetaldehyde dipropyl acetal, recovered
At 90–95° C./16 mm. diethyl malonate, unreacted, 22.0 g.=34.4% of initial
At 135–140° C./16 mm. diethyl maleate, unreacted, 10.0 g.=19.4% of initial
At 194–197° C./16 mm. ethyl propane-1.1.2.3-tetracarboxylate 72.0 g.=72.25% of the theoretical amount Only a very small proportion of the esters had been saponified.

EXAMPLE 2

*Addition of diethyl malonate to benzal-acetophenone*

20 g. powdered potassium hydroxide, containing 16.08 g. (0.3 mol) pure KOH, were converted into the complex with 200 cc. acetaldehyde dipropyl acetal. A solution of 62.4 g. (0.3 mol) benzal-acetophenone in 64.0 g. (0.4 mol) diethyl malonate was slowly added to the fine, well stirred suspension at 20° C. An exothermic reaction, raising the internal temperature to about 40° C., set in, the mixture becoming rather thick, due to enolate formation. Heating was then applied and the agitation continued for 1 hour at 90° C. As the mixture could only be stirred with difficulty, another 200 cc. of acetaldehyde dipropyl acetal were added.

The mixture was cooled, decomposed with ice water and immediately acidified with a slight excess of dilute sulphuric acid. The acetal layer was separated, washed with water and dried.

Fractional distillation gave:

At 50–60° C./17 mm. acetaldehyde dipropyl acetal, recovered
At 90–95° C./16 mm. diethyl malonate, unreacted, 26.0 g.=40.6% of the initial amount (including the excess of 25%)
At 180–200° C./2 mm. benzal-acetophenone, unreacted, 12.5 g.=20.0% of the initial amount
At 218–220 C./3 mm. ethyl $\alpha$-carbethoxy-$\beta$-phenyl-$\gamma$-benzoylbutyrate, 78.0 g.=70.6% of the theoretical amount The very viscous, yellowish oil gave, upon treatment with dilute methanol, colourless crystals of M. P. 64–65° C. Recrystalisation from alcohol raised the melting point to 66–67° C.

The structure was proved by conversion into $\beta$-phenyl-$\gamma$-benzoyl-butyric acid, M. P. 152° C.

EXAMPLE 3

*Addition of diethyl-malonate to benzal-acetone*

20 g. powdered potassium hydroxide, containing 16.8 g. (0.3 mol) pure KOH, were converted into the complex with 300 cc. acetaldehyde dipropyl acetal. A solution of 43.8 g. (0.3 mol) benzal-acetone in 64.0 g. (0.4 mol) diethyl malonate was slowly added to the fine, well stirred suspension at room temperature. An exothermic reaction, raising the internal temperature to about 40° C., set in, the mixture becoming rather thick, due to enolate formation. Heating was then applied and the agitation continued at 90° C. for 1 hour. The mixture was cooled, decomposed with ice water and immediately acidified with a slight excess of dilute sulphuric acid. The acetal layer was separated, washed with water and dried. Fractional distillation gave:

At 50–60° C./16 mm. acetaldehyde dipropyl acetal, recovered
At 90–95° C./16 mm. diethyl malonate, unreacted, 19.5 g.=30.5% of the initial amount (including the excess of 25%)
At 135–145° C./16 mm. benzal-acetone, unreacted, 6.0 g.=13.7% of the initial amount
At 200–225° C./18 mm. on redistillation 205–210° C./17 mm. ethyl $\alpha$-carbethoxy-$\beta$-phenyl-$\gamma$-acetyl-butyrate, 77.0 g.=83.9% of the theoretical amount This substance is a colourless viscous oil.
Found: C, 66.2; H, 7.2. Calc. for $C_{17}H_{22}O_5$: C, 66.6; H, 7.2.

The structure was proved by conversion into $\beta$-phenyl-$\gamma$-acetyl-butyric acid, M. P. 84–85° C.

EXAMPLE 4

*Addition of ethyl aceto-acetate to diethyl maleate*

20 g. powdered potassium hydroxide, containing 16.8 g. (0.3 mol) pure KOH, were converted into the complex with 180 cc. acetaldehyde dipropylacetal. A mixture of 51.6 g. (0.3 mol) diethyl maleate and 52.0 g. (0.4 mol) ethyl aceto-acetate was slowly added to the fine, well stirred suspension at 20° C. A slightly exothermic reaction, raising the temperature to about 27° C., set in, the mixture becoming thick, due to the formation of the enolate. The stirring was continued at 90° C. for 1 hour. The reaction mixture was cooled, decomposed with ice water and immediately slightly acidified with dilute sulphuric acid. The acetal layer was separated, dried and submitted to fractional distillation:

B. P. 50–60° C./17 mm. acetaldehyde-dipropyl acetal, recovered
B. P. 70–80° C./16 mm. ethyl aceto-acetate, unreacted 16.5 g.=31.7% of initial (including the excess used)
B. P. 135–140° C./16 mm. diethyl maleate, unreacted, 11.0 g.=21.3% of initial
B. P. 195–196° C./16 mm. triethyl-$\alpha$-acetyl-tricarballylate 65.0 g.=71.7% of the theoretical quantity Only a very small proportion of the esters had been saponified.
The triethyl ester of $\alpha$-acetyl-tricarballylic acid was a colourless liquid of B. P. 189° C./12 mm. It gave with $FeCl_3$ a purple red colouration.

EXAMPLE 5

*Addition of benzyl cyanide to diethyl maleate*

20 g. powdered potassium hydroxide, containing 16.8 g. (0.3 mol) pure KOH, were converted into the complex with 180 cc. acetaldehyde-dipropyl acetal. A mixture of 51.6 g. (0.3 mol) diethyl maleate and 46.8 g. (0.4 mol) benzyl cyanide was slowly added to the fine, well stirred suspension at 20° C. A strongly exothermic reaction set in, raising the temperature to about 50° C. The stirring was continued at 95° C. for 1 hour. The reaction mixture was cooled, decomposed with ice water and immediately slightly acidified with dilute sulphuric acid. The acetal layer was separated, dried and submitted to fractional distillation:

B. P. 50–60° C./17 mm. acetaldehyde-dipropyl acetal, recovered
B. P. 135–140° C./16 mm. diethyl maleate, unreacted, 11.0 g.=21.3% of initial
B. P. 140–148° C./16 mm. benzyl cyanide, unreacted, 14.0 g.= 30.0% of initial (including the excess used)
B. P. 230–235° C./20 mm. diethyl 3-phenyl-3-cyano-propane-1.2-dicarboxylate, 64.5 g.= 74.3% of the theoretical quantity The diethyl ester of 3 - phenyl - 3 - cyano-propane-1.2-dicarboxylic acid was a colourless viscous oil which showed, on redistillation, B. P. 220–222° C./14 mm.

EXAMPLE 6

*Addition of aceto-nitrile to benzal-acetone*

20 g. powdered potassium hydroxide, containing 16.8 g. (0.3 mol) pure KOH, were converted into the complex with 180 cc. acetaldehyde-dipropyl acetal. A mixture of 43.8 g. (0.3 mol) benzal-acetone and 16.4 g. (0.4 mol) acetonitrile was added slowly to the fine, well stirred suspension at 20° C. An exothermic reaction set in, raising the internal temperature to 40° C. The stirring was continued at 75° C. for 1 hour. The reaction mixture was cooled, decomposed with ice water and immediately slightly acidified with dilute sulphuric acid. The acetal layer was separated and dried. The excess of unreacted aceto-nitrile was contained in the aqueous solution. Fractional distillation of the acetal solution gave:

B. P. 50–60° C./17 mm. acetaldehyde-dipropyl-acetal, recovered
B. P. 135–140° C./16 mm. benzal-acetone, unreacted, 6.0 g.=13.7% of initial
B. P. 235–240° C./18 mm. β-phenyl-γ-acetyl-butyro-nitrile 35.0 g.=62.3% of the theoretical amount A hard resin remained as residue in the distillation flask.

The β-phenyl-γ-acetyl-butyro nitrile was a yellow, very viscous oil which showed, on redistillation, B. P. 235–236° C./17 mm.

The structure was proved by saponification to β-phenyl-γ-acetyl-butyric acid which, recrystallised from ethanol, was obtained in colourless needles of M. P. 84–85° C.

EXAMPLE 7

*Addition of ethyl aceto-acetate to butylidene-butanal*

20 g. powdered potassium hydroxide, containing 16.8 g. (0.3 mol) pure KOH, were converted into the complex with 180 cc. acetaldehyde-dipropyl acetal. A mixture of 37.8 g. (0.3 mol) butylidene-butanal and 52.0 g. (0.4 mol) ethyl aceto-acetate was added slowly to the fine, well stirred suspension at 20° C. The stirring was continued at 95° C. for 1 hour. The reaction mixture was cooled, decomposed with ice water and immediately slightly acidified with dilute sulphuric acid. The acetal layer was separated, dried and submitted to fractional distillation.

After the recovery of acetaldehyde-dipropyl acetal at B. P. 50–60° C./17 mm., a fraction of B. P. 70–85° C./16 mm. was obtained, consisting of a mixture of unreacted ethyl aceto-acetate and butylidene-butanal which have nearly the same boiling points.

Finally, a fraction of B. P. 160–180° C./25 mm. was separated. Redistillation showed B. P. 155–165° C./12 mm. The substance, obtained in a yield of 47 g.=61.2% of the theoretical amount, was a colourless liquid which reduced quickly ammoniacal silver nitrate solution to a silver mirror and gave with $FeCl_3$ a deep purple blue colouration. Its structure was assumedly 2-ethyl-3-propyl-4-acetyl-4-carbethoxy-butane-1-al.

Found: C, 65.9; H, 9.9. Calc. for $C_{14}H_{24}O_4$ C, 65.6; H, 9.4.

What I claim and desire to secure by Letters Patent is:

1. A process for carrying out a condensation reaction between (a) a substance containing a group which is a member of the series consisting of methylene ($CH_2$) and methine (CH) groups directly linked to an unsaturated carbon atom including a carbon atom forming part of an aromatic nucleus on the one hand and (b) a substance which is a member of the series consisting of α,β-unsaturated aldehydes, α,β-unsaturated ketones and esters of α,β-unsaturated carboxylic acids on the other hand, characterised by carrying out the reaction in the presence of an extremely finely divided solid complex formed from potassium hydroxide and an organic liquid having a boiling point above 100° C. and which is a member of the group consisting of acetals, ketals, and the dialkyl ethers of ethylene glycols.

2. A process for carrying out a condensation reaction between a diester of malonic acid on the one hand and a substance which is a member of the series consisting of α,β-unsaturated aldehydes, α,β-unsaturated ketones and esters of α,β-unsaturated carboxylic acids on the other hand, characterised by carrying out the reaction in the presence of an extremely finely divided solid complex formed from potassium hydroxide and an organic liquid which has a boiling point above 100° C. and which is a member of the group consisting of acetals, ketals, and the dialkyl ethers of ethylene glycols.

3. A process for carrying out a condensation reaction between an ester of acetoacetic acid on the one hand and a substance which is a member of the series consisting of α,β-unsaturated aldehydes, α,β-unsaturated ketones and esters of α,β-unsaturated carboxylic acids on the other hand, characterised by carrying out the reaction in the presence of an extremely finely divided solid complex formed from potassium hydroxide and an organic liquid having a boiling point above 100° C. and which is a member of the group consisting of acetals, ketals, and the dialkyl ethers of ethylene glycols.

4. A process for carrying out a condensation reaction between a nitrile of a carboxylic acid on the one hand and a substance which is a member of the series consisting of α,β-unsaturated aldehydes, α,β-unsaturated ketones and esters of α,β- unsaturated carboxylic acids on the other hand, characterised by carrying out the reaction in the presence of an extremely finely divided solid complex formed from potassium hydroxide and an organic liquid having a boiling point above 100° C. and which is a member of the group consisting of acetals, ketals, and the dialkyl ethers of ethylene glycols.

5. A process for carrying out a condensation reaction between an ester of acetoacetic acid on the one hand and diethyl maleate on the other hand, characterized by carrying out the said reaction in the presence of an extremely finely divided solid complex formed from potassium hydroxide and an organic liquid having a boiling point above 100° C., and which is a member of the group consisting of acetals, ketals, and the dialkyl ethers of ethylene glycols, and an excess of such organic liquid.

CHARLES WEIZMANN.

REFERENCES CITED

The following references are of record in the file of this patent:

UNITED STATES PATENTS

| Number | Name | Date |
|---|---|---|
| 2,093,519 | Hamann | Sept. 21, 1937 |
| 2,328,370 | Wiest | Aug. 31, 1943 |
| 2,345,170 | Zeltner et al. | Mar. 28, 1944 |

OTHER REFERENCES

Ser. No. 326,804, Zeltner et al. (A. P. C.) pub. Apr. 20, 1943.